United States Patent
Teh

(10) Patent No.: US 12,531,484 B2
(45) Date of Patent: Jan. 20, 2026

(54) POWER SUPPLY CIRCUIT FOR PREVENTING INTERNAL BREAKDOWN

(71) Applicants: Kabushiki Kaisha Toshiba, Tokyo (JP); Toshiba Electronic Devices & Storage Corporation, Tokyo (JP)

(72) Inventor: Chen kong Teh, Ota Tokyo (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 221 days.

(21) Appl. No.: 18/118,729

(22) Filed: Mar. 7, 2023

(65) Prior Publication Data

US 2024/0106329 A1 Mar. 28, 2024

(30) Foreign Application Priority Data

Sep. 26, 2022 (JP) ................. 2022-153010

(51) Int. Cl.
*H02M 3/158* (2006.01)
*H02H 11/00* (2006.01)
*H02M 1/08* (2006.01)

(52) U.S. Cl.
CPC .......... *H02M 3/158* (2013.01); *H02H 11/003* (2013.01); *H02M 1/08* (2013.01)

(58) Field of Classification Search
CPC ........ H02M 1/32; H02M 1/08; H02H 11/002; H02H 11/003
See application file for complete search history.

(56) References Cited

U.S. PATENT DOCUMENTS

| 5,410,441 | A  | * | 4/1995  | Allman  | H02H 11/003 361/84 |
| 6,304,422 | B1 | * | 10/2001 | Sander  | H02H 11/003 361/84 |
| 9,312,688 | B1 | * | 4/2016  | Farina  | H02H 11/003 |
| 2020/0028503 | A1 | | 1/2020 | Soma | |
| 2020/0067501 | A1 | | 2/2020 | Hayashi | |

(Continued)

FOREIGN PATENT DOCUMENTS

| CN | 106452372 A | * | 2/2017 | ............... H03F 1/26 |
| CN | 207588698 U | * | 7/2018 | |
| JP | 2002512498 A |   | 4/2002 | |

(Continued)

OTHER PUBLICATIONS

Demo Manual DC2062A, "LT4363-1/LT4363-2 12V Systems ISO-7637-2 Surge Stopper," Linear Technology, 2013 (Year: 2013).*

(Continued)

*Primary Examiner* — Jue Zhang
*Assistant Examiner* — Jye-June Lee
(74) *Attorney, Agent, or Firm* — Kim & Stewart LLP

(57) ABSTRACT

A power supply circuit of an embodiment includes a first transistor including a source connected to an input terminal, and a gate connected to a first node; a second transistor including a drain connected to a drain of the first transistor, and a source connected to an output terminal; a third transistor including a source connected to the input terminal, a drain connected to the first node, and a gate connected to a second node; and a Zener diode including an anode connected to the input terminal, and a cathode connected to the second node.

10 Claims, 7 Drawing Sheets

(56) References Cited

U.S. PATENT DOCUMENTS

2021/0184667 A1    6/2021    Hayashi et al.

FOREIGN PATENT DOCUMENTS

| | | |
|---|---|---|
| JP | 2020-014356 A | 1/2020 |
| JP | 2021-097324 A | 6/2021 |
| JP | 2021-158861 A | 10/2021 |
| JP | 7002423 B2 | 1/2022 |

OTHER PUBLICATIONS

Office Action mailed Aug. 26, 2025 in corresponding Japanese Patent Application No. 2022-153010 with English translation, 7 pages.

* cited by examiner

POWER SUPPLY CIRCUIT FOR PREVENTING INTERNAL BREAKDOWN

CROSS-REFERENCE TO RELATED APPLICATION

This application is based upon and claims the benefit of priority from the prior Japanese Patent Application No. 2022-153010 filed on Sep. 26, 2022; the entire contents of which are incorporated herein by reference.

FIELD

Embodiments described herein relate generally to a power supply circuit.

BACKGROUND

In a power supply circuit, a switch circuit is connected to a power supply line in an inserted manner so as to prevent breakdown of an internal circuit when a power supply and a ground are connected in reverse.

DETAILED DESCRIPTION

A power supply circuit of an embodiment includes a first transistor including a source connected to an input terminal, and a gate connected to a first node; a second transistor including a drain connected to a drain of the first transistor, and a source connected to an output terminal; a third transistor including a source connected to the input terminal, a drain connected to the first node, and a gate connected to a second node; and a Zener diode including an anode connected to the input terminal, and a cathode connected to the second node.

Hereinafter, an embodiment will be described with reference to the drawings.

First Embodiment

Figure 1:
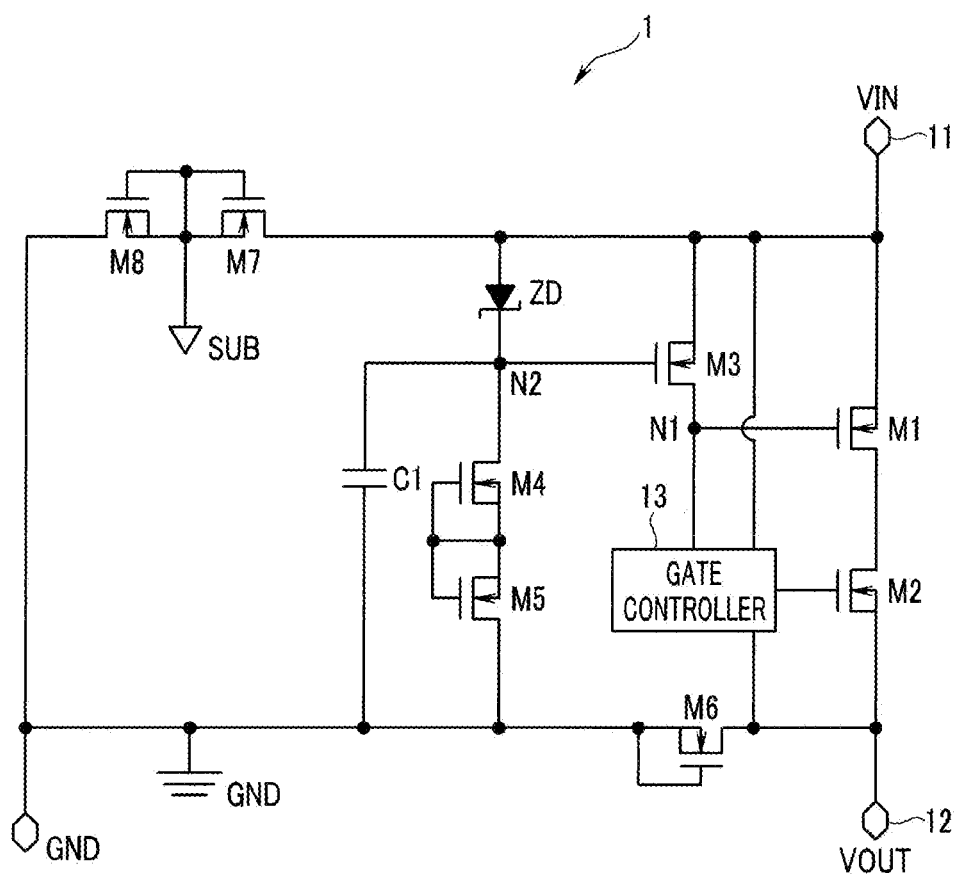
FIG. 1 is a circuit diagram illustrating an example of a power supply circuit according to a first embodiment.

FIG. 1 is a circuit diagram illustrating an example of a power supply circuit according to a first embodiment.

A power supply circuit 1 of the present embodiment includes an input terminal 11 supplied with an input voltage VIN as power from outside; an output terminal 12 that outputs an output voltage VOUT to an external load circuit; a gate controller 13; transistors M1, M2, M3, M4, M5, M6, M7, and M8; a Zener diode ZD; and a capacitor C1. The transistors M1 to M8 are NMOS transistors.

The transistor M1 includes a source connected to the input terminal 11, and a drain connected to a drain of the transistor M2. In addition, the transistor M1 includes a gate connected between the gate controller 13 and a drain of the transistor M3.

The transistor M2 includes a source connected to the output terminal 12, and a drain connected to the drain of the transistor M1. In addition, the transistor M2 includes a gate connected to the gate controller 13.

The transistor M3 includes a source connected to the input terminal 11, and a drain connected to a node N1. In addition, the transistor M3 includes a gate connected to a node N2.

The transistor M4 includes a drain connected to the node N2. The transistor M5 includes a drain connected to a reference potential GND. The transistors M4 and M5 include gates and sources connected in common. In other words, the transistors M4 and M5 are connected back-to-back.

The transistor M6 includes a drain connected between the transistor M2 and the output terminal 12. In addition, the transistor M6 includes a gate and a source connected in common to the reference potential GND.

The transistor M7 includes a drain connected to the input terminal 11. The transistor M8 includes a drain connected to an external reference potential GND via a GND terminal. The transistors M7 and M8 include gates and sources connected in common to a reference potential SUB of a substrate. In other words, the transistors M7 and M8 are connected back-to-back. Accordingly, a shoot-through current is prevented from flowing from the reference potential GND into the input terminal 11 when the input voltage VIN and the reference potential GND are connected in reverse.

The Zener diode ZD includes an anode connected to the input terminal 11, and a cathode connected to the node N2.

The capacitor C1 is connected in parallel with the transistors M4 and M5, and includes one end connected to the node N2, and the other end connected to the reference potential GND. The capacitor C1 is a fast-response capacitor for rapidly turning on the transistor M3 when the input voltage VIN has become lower than the reference potential GND.

The gate controller 13 inputs a gate control signal to the transistors M1 and M2 to control on/off of the transistors M1 and M2.

Figure 2:
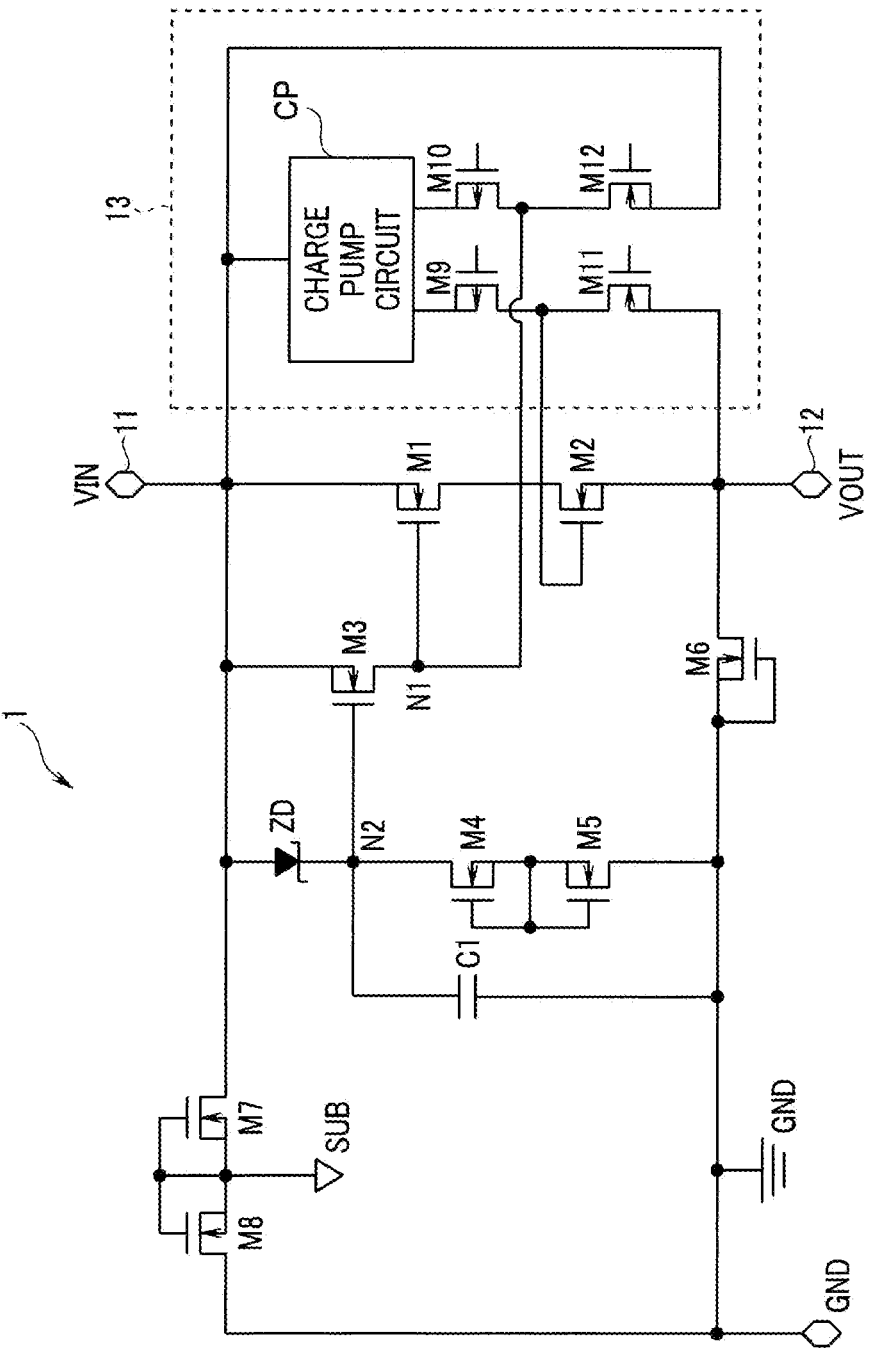
FIG. 2 is a circuit diagram of the power supply circuit illustrating the internal configuration of a gate controller.

FIG. 2 is a circuit diagram of the power supply circuit illustrating the internal configuration of the gate controller.

As illustrated in FIG. 2, the gate controller 13 includes a charge pump circuit CP and transistors M9, M10, M11, and M12.

The charge pump circuit CP boosts the input voltage VIN supplied from the input terminal 11, and supplies the resulting voltage to sources of the transistors M9 and M10.

The transistors M9 and M10 are PMOS transistors. The transistors M11 and M12 are NMOS transistors.

The transistor M9 includes a source connected to the charge pump circuit CP, and a drain connected to a drain of the transistor M11.

The transistor M10 includes a source connected to the charge pump circuit CP, and a drain connected to a drain of the transistor M12.

The transistor M11 includes a drain connected to the drain of the transistor M9, and a source connected to the output terminal 12.

The transistor M12 includes a drain connected to the drain of the transistor M10, and a source connected to the input terminal 11.

Gates of the transistors M9 to M12 are supplied with a control signal. The control signal is supplied from outside of the power supply circuit 1. For example, when a control signal for turning on the transistors M9 and M10 and turning off the transistors M11 and M12 is supplied, a voltage boosted by the charge pump circuit CP is supplied to the gates of the transistor M1 and M2.

When the transistors M1 and M2 are turned on, the power supply circuit 1 outputs the input voltage VIN, which has been inputted to the input terminal 11, from the output terminal 12 as the output voltage VOUT.

Meanwhile, when the input voltage VIN is suddenly pulled down and a high negative voltage is supplied, a reverse current flows through the Zener diode ZD. Accordingly, an inrush current flows through the transistors M4 and M5, and thus charges the node N2. When the charging of the node N2 is complete, the transistors M4 and M5 automatically shut off the inrush current. Accordingly, when a voltage of −60 V is supplied as a high negative voltage to the input voltage VIN, for example, the node N2 is charged with a voltage of −55 V.

When a voltage of −60 V is supplied to the input voltage VIN, and the node N2 is charged with a voltage of −55 V, a voltage of 5 V is applied as the gate-source voltage Vgs of the transistor M3, thereby turning on the transistor M3.

When the transistor M3 is turned on, the potential of the node N1 connected to the gate of the transistor M1 is suddenly discharged to the input terminal 11. Consequently, the transistor M1 is turned off so that an inrush current between the input terminal 11 and the output terminal 12 can be prevented.

As described above, the power supply circuit 1 of the present embodiment can accommodate even a high input voltage when the power supply and the ground are connected in reverse.

Second Embodiment

Figure 3:
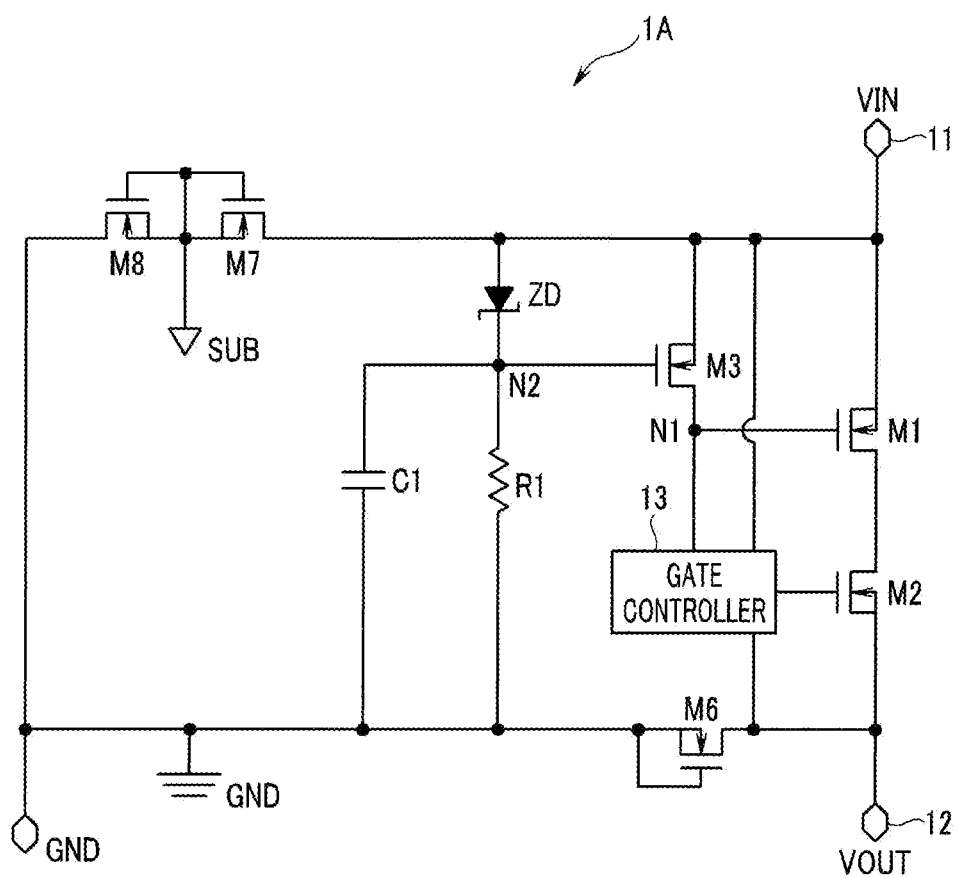
FIG. 3 is a circuit diagram illustrating an example of a power supply circuit according to a second embodiment.

FIG. 3 is a circuit diagram illustrating an example of a power supply circuit according to a second embodiment. Note that in FIG. 3, components similar to the components in FIG. 1 are denoted by identical reference signs, and repeated description will be omitted.

A power supply circuit 1A includes a resistor R1 instead of the transistors M4 and M5 in the power supply circuit 1 of FIG. 1. The resistor R1 is a resistor for pulling up the potential of the node N2 when the input voltage VIN has become lower than the reference potential GND. The other components are the same as the components of the power supply circuit 1 in the first embodiment.

When a high negative voltage is supplied to the input voltage VIN, a reverse current flows through the Zener diode ZD so that the potential of the node N2 becomes higher than the input voltage VIN. For example, when a voltage of −60 V is supplied to the input voltage VIN, the voltage of the node N2 becomes −55 V that is higher than the input voltage VIN.

When a voltage of −60 V is supplied to the input voltage VIN, and the voltage of the node N2 becomes −55 V, a voltage of 5 V is applied as the gate-source voltage Vgs of the transistor M3, thereby turning on the transistor M3.

When the transistor M3 is turned on, the potential of the node N1 connected to the gate of the transistor M1 is suddenly discharged to the input terminal 11. Consequently, the transistor M1 is turned off so that an inrush current between the input terminal 11 and the output terminal 12 can be prevented.

Accordingly, as in the first embodiment, the power supply circuit 1A can accommodate even a high input voltage when the power supply and the ground are connected in reverse.

(Modification 1)

Figure 4:
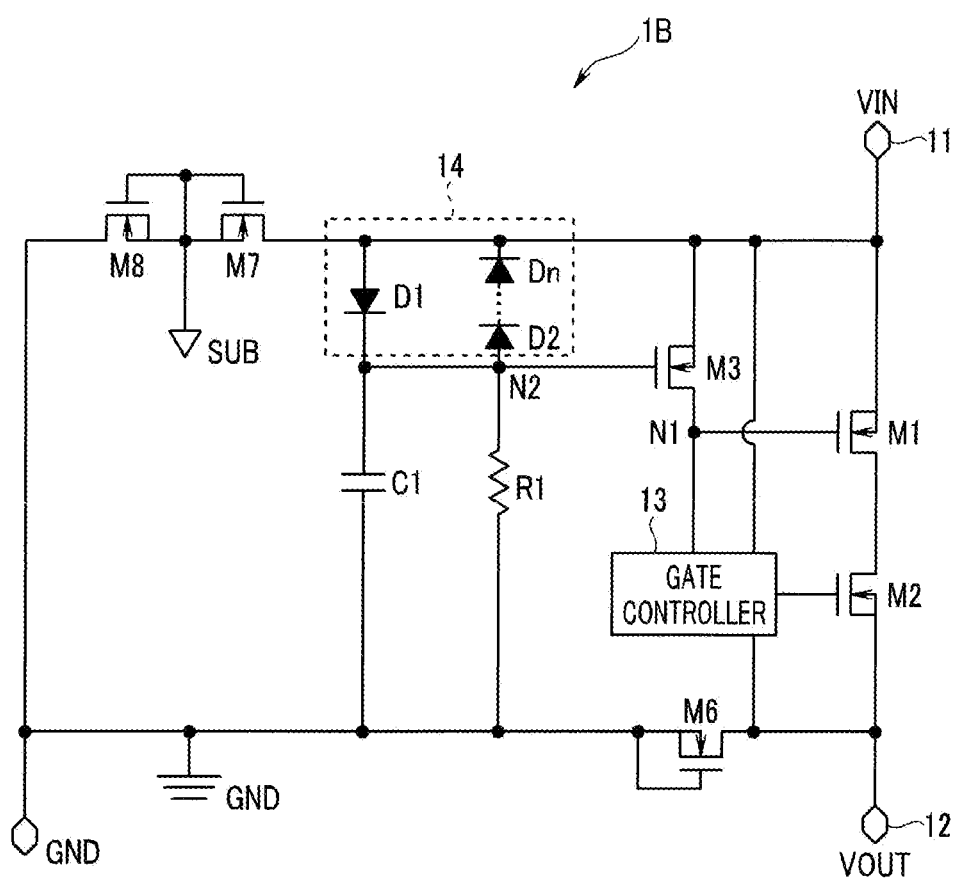
FIG. 4 is a circuit diagram illustrating an example of a power supply circuit according to Modification 1 of the second embodiment.

FIG. 4 is a circuit diagram illustrating an example of a power supply circuit according to Modification 1 of the second embodiment. Note that in FIG. 4, components similar to the components in FIG. 3 are denoted by identical reference signs, and repeated description will be omitted.

A power supply circuit 1B includes a plurality of diodes D1, D2, ..., Dn (hereinafter, one or more diodes shall be referred to as "diodes D") instead of the Zener diode ZD in the power supply circuit 1A. The other components are the same as the components of the power supply circuit 1A in the second embodiment.

The plurality of diodes D are connected in a forward direction between the input terminal 11 and the node N2. When a voltage of −60 V is supplied to the input voltage VIN, the plurality of diodes D drop the voltage by 5 V, for example, thereby setting the node N2 at −55 V.

According to the foregoing configuration, when a high negative voltage is supplied to the input voltage VIN, the transistor M3 is turned off. Accordingly, as the potential of the node N1 is suddenly discharged to the input terminal 11, the transistor M1 is turned off so that an inrush current between the input terminal 11 and the output terminal 12 can be prevented.

Accordingly, as in the second embodiment, the power supply circuit 1B can accommodate even a high input voltage when the power supply and the ground are connected in reverse.

(Modification 2)

Figure 5:
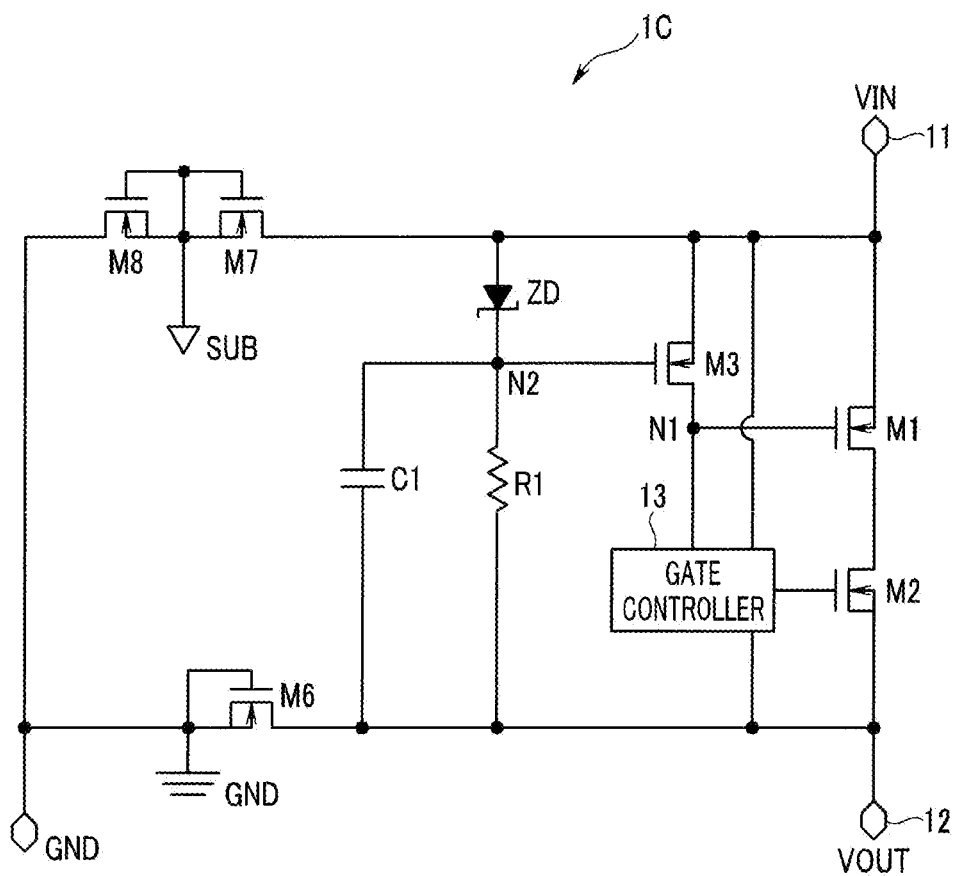
FIG. 5 is a circuit diagram illustrating an example of a power supply circuit according to Modification 2 of the second embodiment.

FIG. 5 is a circuit diagram illustrating an example of a power supply circuit according to Modification 2 of the second embodiment. Note that in FIG. 5, components similar to the components in FIG. 3 are denoted by identical reference signs, and repeated description will be omitted.

In the power supply circuit 1A of FIG. 3, the other end of the capacitor C1 and the other end of the resistor R1 are connected to the reference potential GND.

In contrast, in a power supply circuit 1C of Modification 2, the other end of the capacitor C1 and the other end of the resistor R1 are connected to the output terminal 12. The other components are the same as the components of the power supply circuit 1A in the second embodiment.

When a high negative voltage is supplied to the input voltage VIN, the transistor M1 is turned off. Thus, the output terminal 12 is equivalent to the reference potential GND. Therefore, the power supply circuit 1C can serve a function similar to the function of the power supply circuit 1A.

Accordingly, as in the second embodiment, the power supply circuit 1C can accommodate even a high input voltage when the power supply and the ground are connected in reverse.

(Modification 3)

Figure 6:
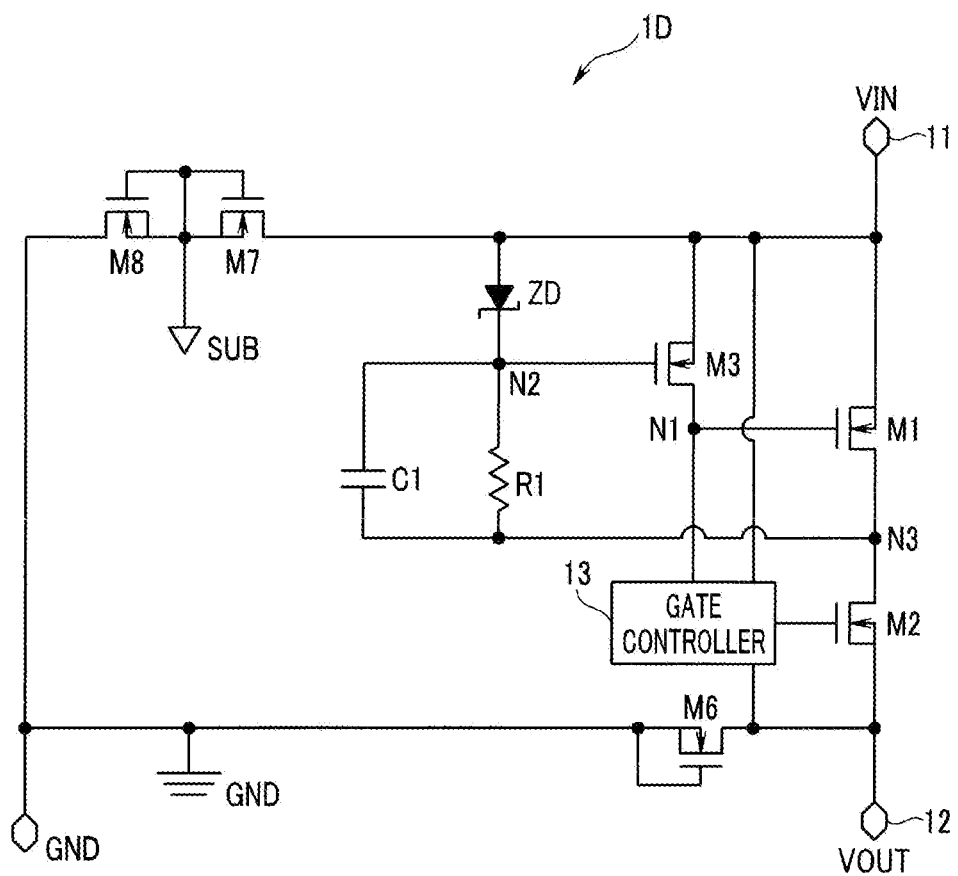
FIG. 6 is a circuit diagram illustrating an example of a power supply circuit according to Modification 3 of the second embodiment.

FIG. 6 is a circuit diagram illustrating an example of a power supply circuit according to Modification 3 of the second embodiment. Note that in FIG. 6, components similar to the components in FIG. 3 are denoted by identical reference signs, and repeated description will be omitted.

In the power supply circuit 1A of FIG. 3, the other end of the capacitor C1 and the other end of the resistor R1 are connected to the reference potential GND.

In contrast, in a power supply circuit 1D of Modification 3, the other end of the capacitor C1 and the other end of the resistor R1 are connected to a node N3 between the transistor M1 and the transistor M2. The other components are the same as the components of the power supply circuit 1A in the second embodiment.

When a high negative voltage is supplied to the input voltage VIN, the transistor M1 is turned off. Thus, the node N3 is equivalent to the reference potential GND. Therefore, the power supply circuit 1D can serve a function similar to the function of the power supply circuit 1A.

Accordingly, as in the second embodiment, the power supply circuit 1D can accommodate even a high input voltage when the power supply and the ground are connected in reverse.

(Modification 4)

Figure 7:
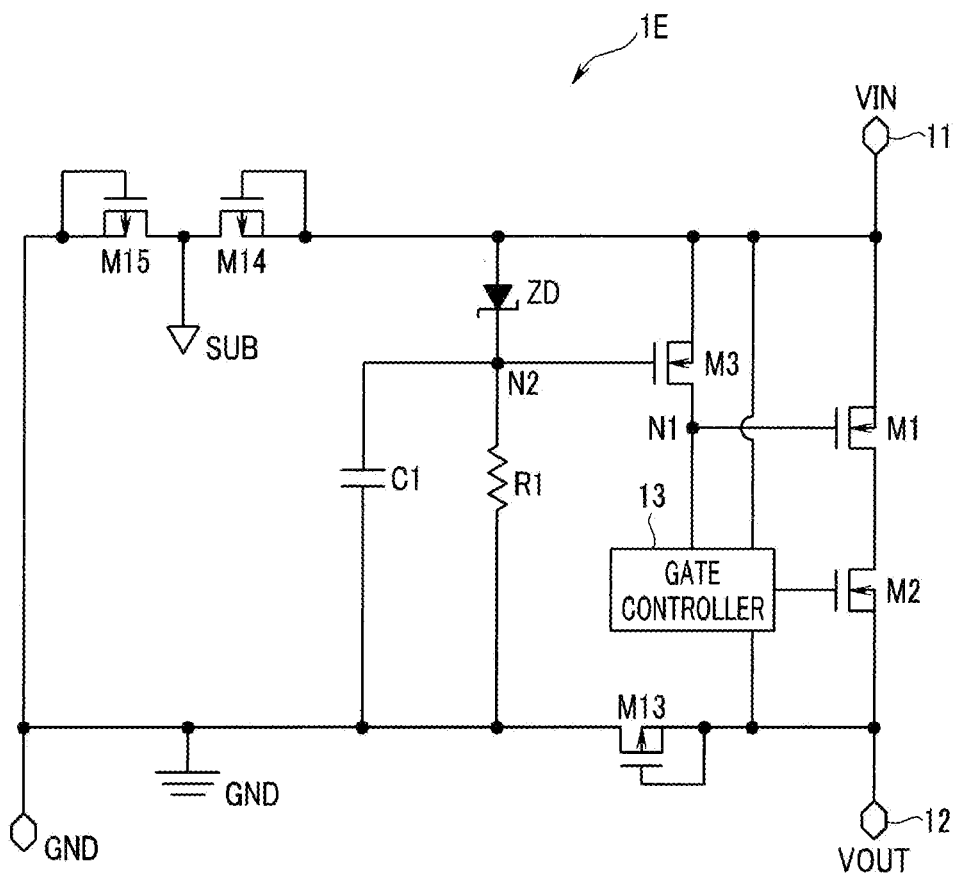
FIG. 7 is a circuit diagram illustrating an example of a power supply circuit according to Modification 4 of the second embodiment.

FIG. 7 is a circuit diagram illustrating an example of a power supply circuit according to Modification 4 of the second embodiment. Note that in FIG. 7, components similar to the components in FIG. 3 are denoted by identical reference signs, and repeated description will be omitted.

A power supply circuit 1E includes transistors M13, M14, and M15 instead of the transistors M6, M7, and M8 in the power supply circuit 1A.

The transistors M13, M14, and M15 are PMOS transistors. In other words, the power supply circuit 1E includes the PMOS transistors M13, M14, and M15 instead of the NMOS transistors M6, M7, and M8 in the power supply circuit 1A.

The other components are the same as the components of the power supply circuit 1A in the second embodiment.

The transistor M13 includes a drain connected to the reference potential GND, and a gate and a source connected in common to the output terminal 12.

The transistor M14 includes a gate and a source connected in common to the input terminal 11. The transistor M15 includes a gate and a source connected in common to the reference potential GND. The transistors M14 and M15 include drains connected in common to the reference potential SUB.

The transistors M14 and M15 are connected back-to-back. Consequently, the power supply circuit 1E prevents a shoot-through current from flowing into the reference potential GND from the input terminal 11 when the input voltage VIN and the reference potential GND are connected in reverse.

Note that the configurations of Modifications 1 to 4 of the second embodiment are also applicable to the configuration of the power supply circuit 1 in the first embodiment.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A power supply circuit comprising:
   a first transistor including a source connected to an input terminal, and a gate connected to a first node;
   a second transistor including a drain connected to a drain of the first transistor, and a source connected to an output terminal;
   a third transistor including a source connected to the input terminal, a drain connected to the first node, and a gate connected to a second node;
   a Zener diode including an anode connected to the input terminal, and a cathode connected to the second node; and
   a fourth transistor and a fifth transistor that are connected between the second node and a reference potential, the fourth transistor and the fifth transistor being NMOS transistors including gates and sources connected in common.

2. The power supply circuit according to claim 1, further comprising a capacitor connected in parallel with the fourth transistor and the fifth transistor.

3. The power supply circuit according to claim 1, further comprising a sixth transistor connected between the reference potential and the output terminal.

4. The power supply circuit according to claim 1, further comprising a seventh transistor and an eighth transistor that are connected between the input terminal and the reference potential and include gates and drains connected in common to a reference potential of a substrate.

5. The power supply circuit according to claim 1, further comprising a gate controller, the gate controller being configured to output a gate control signal to the gate of the first transistor and a gate of the second transistor.

6. The power supply circuit according to claim 5, wherein the gate controller is configured to output the gate control signal to the gate of the first transistor via the first node.

7. The power supply circuit according to claim 1, further comprising a resistor, the resistor including one end connected to the second node, and another end connected to a reference potential.

8. The power supply circuit according to claim 1, further comprising a plurality of diodes connected in a forward direction between the input terminal and the second node.

9. The power supply circuit according to claim 1, further comprising a resistor, the resistor including one end connected to the second node, and another end connected to the output terminal.

10. The power supply circuit according to claim 1, further comprising a resistor, the resistor including one end connected to the second node, and another end connected to a third node between the first transistor and the second transistor.

* * * * *